United States Patent
Lee et al.

(10) Patent No.: US 6,174,134 B1
(45) Date of Patent: Jan. 16, 2001

(54) MULTIPLE IMPINGEMENT AIRFOIL COOLING

(75) Inventors: Ching-Pang Lee, Cincinnati; George A. Durgin, West Chester, both of OH (US)

(73) Assignee: General Electric Company, Cincinnati, OH (US)

(*) Notice: Under 35 U.S.C. 154(b), the term of this patent shall be extended for 0 days.

(21) Appl. No.: 09/264,384

(22) Filed: Mar. 5, 1999

(51) Int. Cl.[7] ....................................... F01D 5/18
(52) U.S. Cl. ........................ 416/97 R; 415/115; 415/178
(58) Field of Search ..................... 415/115, 116, 415/177, 178; 416/96 A, 96 R, 97 R

(56) References Cited

U.S. PATENT DOCUMENTS

| 5,356,265 | * 10/1994 | Kercher | 416/97 R |
| 5,472,316 | * 12/1995 | Taslim et al. | 416/97 R |
| 5,797,726 | 8/1998 | Lee . | |

FOREIGN PATENT DOCUMENTS 60-182302 * 9/1985 (JP) ................................ 416/97 R

OTHER PUBLICATIONS

Taslim et al, "Measurements of Heat Transfer Coefficient in Rib–Roughened Trailing–Edge Cavities with Crossover Jets," ASME Paper No. 98–GT–435, Jun. 1998.

* cited by examiner

Primary Examiner—Edward K. Look
Assistant Examiner—Liam McDowell
(74) Attorney, Agent, or Firm—Andrew C. Hess; Rodney M. Young

(57) ABSTRACT

A turbine airfoil includes first and second sidewalls joined together at leading and trailing edges, and spaced apart to define first and second cavities separated by a septum therebetween. An aft bridge extends along the first cavity and includes a row of outlet holes therein. The septum includes a row of inlet holes. And, turbulators are disposed in rows inside the first cavity, and extend from the first sidewall toward the second sidewall. The turbulators are aligned with the inlet holes for multiple impingement cooling thereof.

20 Claims, 4 Drawing Sheets

MULTIPLE IMPINGEMENT AIRFOIL COOLING

BACKGROUND OF THE INVENTION

The present invention relates generally to gas turbine engines, and, more specifically, to turbine airfoil cooling.

In a gas turbine engine, air is pressurized in a compressor and mixed with fuel in a combustor, and ignited for generating hot combustion gases which flow downstream through turbines for extracting energy therefrom. A high pressure turbine (HPT) immediately follows the combustor and includes a stationary nozzle having a plurality of circumferentially spaced apart stator vanes. The combustion gases are directed by the vanes to engage a row of turbine rotor blades extending outwardly from a supporting rotor disk. Energy is extracted from the gases for rotating the rotor disk, which in turn powers the compressor. A low pressure turbine typically follows a HPT for extracting additional energy from the combustion gases for powering a fan in a typical aircraft engine application.

The nozzle vanes and rotor blades define corresponding airfoils with generally concave, pressure sides and generally convex, suction sides specifically configured for maximizing aerodynamic performance. These turbine airfoils are directly exposed to the hot combustion gases and are cooled by using a portion of air bled from the compressor, and suitably channeled therethrough.

In view of the airfoil configuration of the vanes and blades and their specialized functions in the combustion gas field, the various portions of the airfoils are heated differently by the combustion gases, and correspondingly have different cooling requirements. Since the airfoil leading edges first encounter the combustion gases, they require specialized cooling typically provided by a dedicated cooling cavity therein, with one or more rows of film cooling holes disposed in flow communication therewith.

The mid-chord section of the blade airfoil is typically cooled using a serpentine cooling passage therein with wall turbulators for increasing heat transfer cooling therein. The mid-chord region of the nozzle vane is typically internally cooled with dedicated cooling passages typically including separate impingement baffles for directing jets of cooling air against the inner surfaces of the vane.

The typical profile of a vane or blade airfoil increases in width from the leading edges thereof over the mid-chord regions and tapers in thickness to a thin trailing edge. The thin trailing edges are accordingly difficult to cool in view of the limited space between the pressure and suction sidewalls in which cooling features may be introduced.

A blade trailing edge typically includes a dedicated cooling circuit which is separated from the mid-chord serpentine cooling circuit, and receives a portion of the cooling air at the root of the airfoil for flow radially outwardly along the span of the airfoil for discharge through a row of trailing edge cooling holes. The cooling air turns in the trailing edge cavity to the axial direction for discharge through the trailing edge holes.

Trailing edge cooling effectiveness may be improved by introducing a distributed pattern of small pins formed integrally between the pressure and suction sides of the airfoil. Heat in the trailing edge region of the airfoil is then carried through the pins for extraction by the cooling air channeled therearound which is then discharged out the airfoil trailing edge.

In alternate configurations, the trailing edge cooling cavity may include turbulators in the form of elongate ribs which extend in part from the inner surfaces of the pressure or suction sides of the airfoil and over which the cooling air is channeled. Such turbulator ribs are configured to trip the cooling air flow for promoting turbulence of the air and increased heat transfer cooling. However, as the air flows from rib to rib in turn, it becomes hotter and correspondingly is less effective for cooling downstream turbulators in a series thereof. In this configuration, the turbulators are spaced apart along the span or radial axis of the airfoil between the root and tip thereof.

In yet another configuration, the turbulators may similarly be spaced apart along the span of the trailing edge cavity, but the cooling air flow is delivered thereto from an upstream cavity which directs the cooling air in the axial direction across the ribs for discharge through the trailing edge. In this configuration, the extreme thinness of the trailing edge region of the airfoil and the axially directed cooling air limit the cooling ability of the turbulators.

Accordingly, it is desired to improve airfoil cooling, such as near the trailing edges of turbine blades and vanes.

BRIEF SUMMARY OF THE INVENTION

A turbine airfoil includes first and second sidewalls joined together at leading and trailing edges, and spaced apart to define first and second cavities separated by a septum therebetween. An aft bridge extends along the first cavity and includes a row of outlet holes therein. The septum includes a row of inlet holes. And, turbulators are disposed in rows inside the first cavity, and extend from the first sidewall toward the second sidewall. The turbulators are aligned with the inlet holes for multiple impingement cooling thereof.

DETAILED DESCRIPTION OF THE INVENTION

Figure 1:
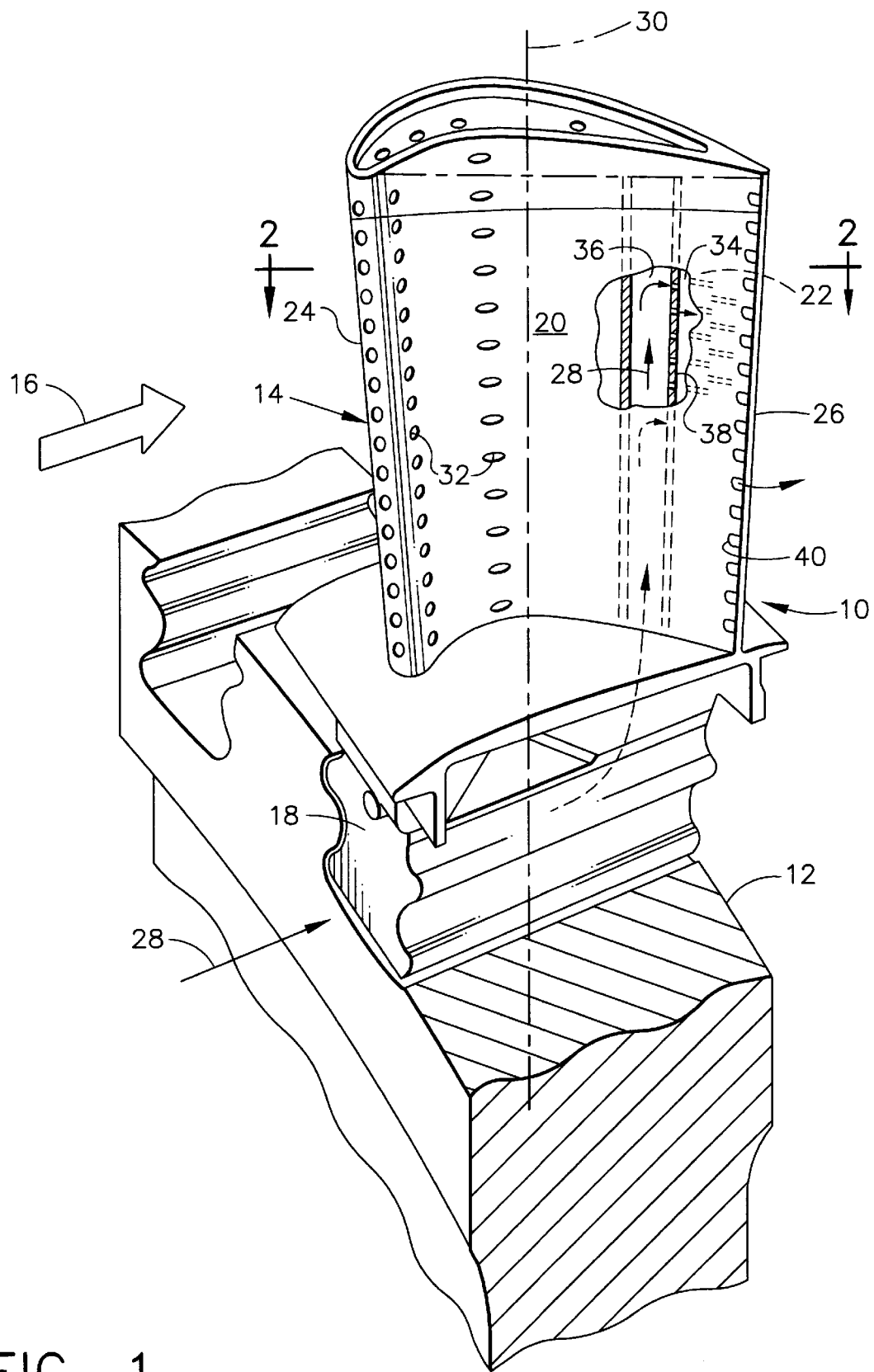
FIG. 1 is an isometric view of a portion of a high pressure turbine rotor including a row of blades extending outwardly from a supporting rotor disk.

Illustrated in FIG. 1 is a portion of a high pressure turbine of a gas turbine engine for powering an aircraft in flight in an exemplary configuration. The first stage turbine rotor illustrated includes a plurality of circumferentially spaced apart turbine rotor blades 10 (only one of which is illustrated) which extend radially outwardly from a rotor disk 12 in a conventional axisymmetrical configuration.

Each blade 10 is in the form of an airfoil 14 for extracting energy from combustion gases 16 channeled thereover from a turbine nozzle and combustor (not shown). Each blade 10 includes an integral axial dovetail 18 joined to the root of the airfoil at a corresponding platform, with the dovetail being mounted in a complementary slot in the perimeter of the disk 12 for retaining the blade thereto.

The airfoil 14 includes opposite first and second sidewalls 20,22 which are joined together at axially opposite leading and trailing edges 24,26. The first sidewall 20 is a generally concave, pressure side of the airfoil, with the second sidewall 22 being a generally convex, suction side of the airfoil. Both sidewalls extend from root to tip of the airfoil in a conventional configuration for extracting energy from the combustion gases during operation.

Since the airfoil 14 is subject to the hot combustion gases 16, it is internally cooled by using a portion of pressurized air 28 bled from a compressor (not shown) of the engine and channeled through the blade dovetail 18 in a conventional manner. The airfoil may include various internal cooling circuits having specialized performance for cooling the various portions of the airfoil during operation. The airfoil may include serpentine cooling passages therein having multiple parallel legs which extend along the span or radial axis 30 of the airfoil. And, various rows of film cooling holes 32 may be provided through the airfoil sidewalls for discharging the internally channeled cooling air in corresponding films over the outer surface of the airfoil for providing film cooling in a conventional manner.

Since the trailing edge region of the airfoil illustrated in FIG. 1 is typically tapered and extremely thin in circumferential direction, effective cooling thereof is difficult to achieve with conventional cooling features. Limited cooling efficiency at the blade trailing edge requires a corresponding increase in cooling air used therefor to limit undesirably high temperatures thereat. Since air used for cooling is not used in the combustion process, overall efficiency of the engine is decreased.

Figure 2:
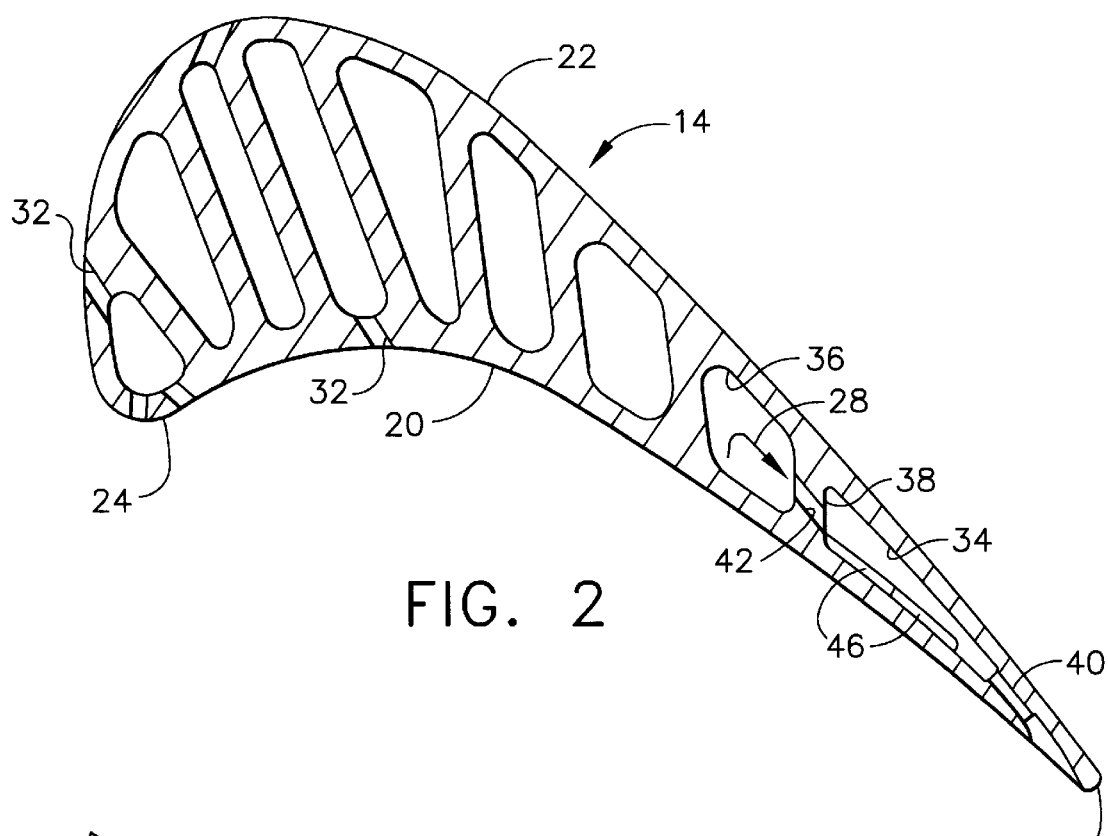
FIG. 2 is a radial sectional view through the blade airfoil illustrated in FIG. 1 and taken along line 2—2.
Figure 3:
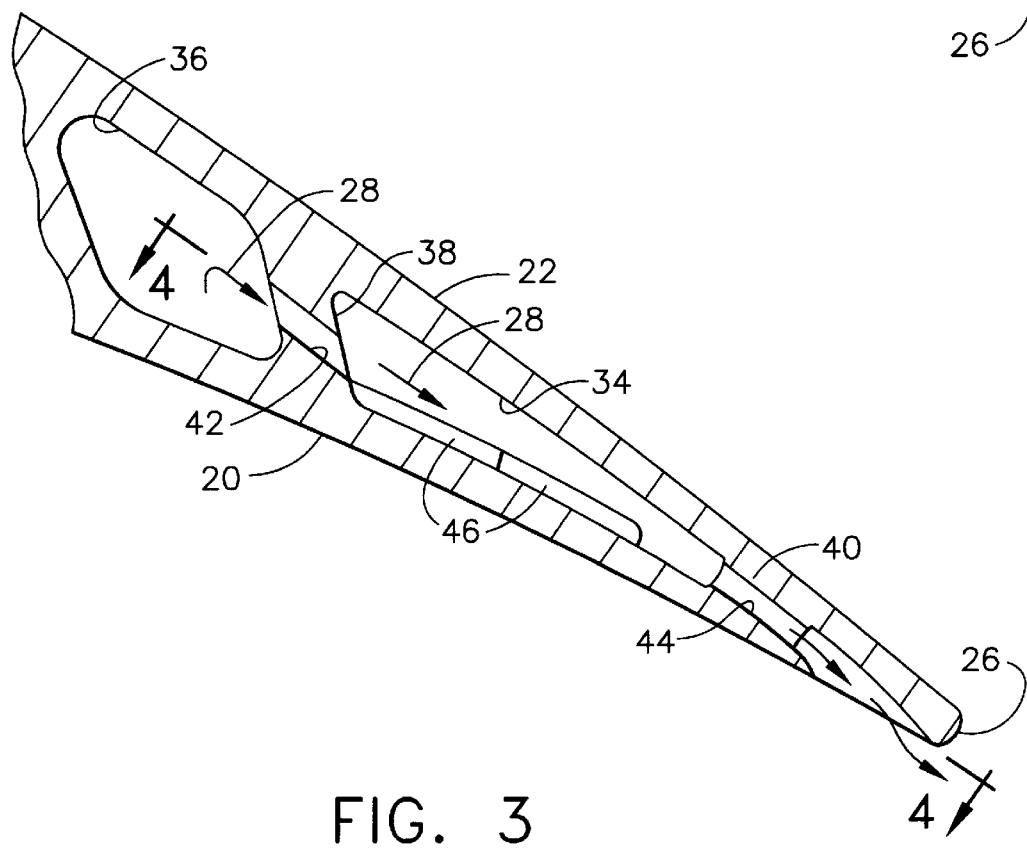
FIG. 3 is an enlarged sectional view of the trailing edge portion of the airfoil illustrated in FIG. 2.

An exemplary section of the airfoil illustrated in FIG. 1 is shown in FIG. 2, with the trailing edge region thereof being enlarged in FIG. 3. In accordance with the present invention, improved internal cooling of the airfoil 14 may be obtained which has particular utility in the relatively thin trailing edge region. As shown in FIGS. 2 and 3, the airfoil also includes first and second passages or cavities 34,36 which extend radially along the span of the airfoil and are defined in part by the opposite first and second sidewalls 20,22 and separated axially along the chord direction of the airfoil by an integral crossover bridge or septum 38 therebetween.

As shown in FIG. 2, the two cavities 34,36 are disposed near the thin trailing edge portion of the airfoil. The airfoil has several additional radial cavities separated by additional bridges up to the leading edge for providing cooling in any conventional manner, which is not the subject of the present invention.

As shown in FIG. 3, the airfoil also includes an aft rib or bridge 40 which is integrally joined between the first and second sidewalls 20,22. The various cavities and bridges are typically formed in the airfoil by casting thereof in any conventional manner.

In the exemplary embodiment illustrated in FIG. 3, the first cavity 34 extends directly along the radial span of the trailing edge 26 and defines a trailing edge cavity. The second cavity 36 also extends radially along the span of the airfoil and is disposed directly forwardly of the first cavity 34 and is separated therefrom by the septum 38. The second cavity 36 is closer to the airfoil leading edge 24, as shown in FIG. 2, than the first cavity 34.

As shown in FIG. 1, the second cavity 36 begins at the root of the airfoil where it receives the cooling air 28 through the dovetail 18, and terminates near the airfoil tip in a continuous radial cavity. In this way, the cooling air flows radially outwardly through the second cavity 36 for delivery in turn to the first cavity 34.

The septum 38 includes a row of crossover or inlet holes 42 as illustrated in FIG. 3 which extend axially through the septum 38 along the chord direction of the airfoil and in flow communication between the first and second cavities 34,36. The inlet holes 42 direct the cooling air 28 in a plurality of radially spaced apart jets in the axial direction toward the trailing edge 26.

The aft bridge 40 includes a row of outlet holes 44 which are radially spaced apart from each other along the span of the airfoil. The outlet holes 44 are in flow communication with the first cavity 34 for discharging the cooling air therefrom through or near the trailing edge 26. In the preferred embodiment illustrated in FIG. 3, the outlet holes 44 extend from the first cavity 34 through the airfoil first sidewall 20 directly adjacent to trailing edge 26 for discharging the cooling air therefrom.

Figure 4:
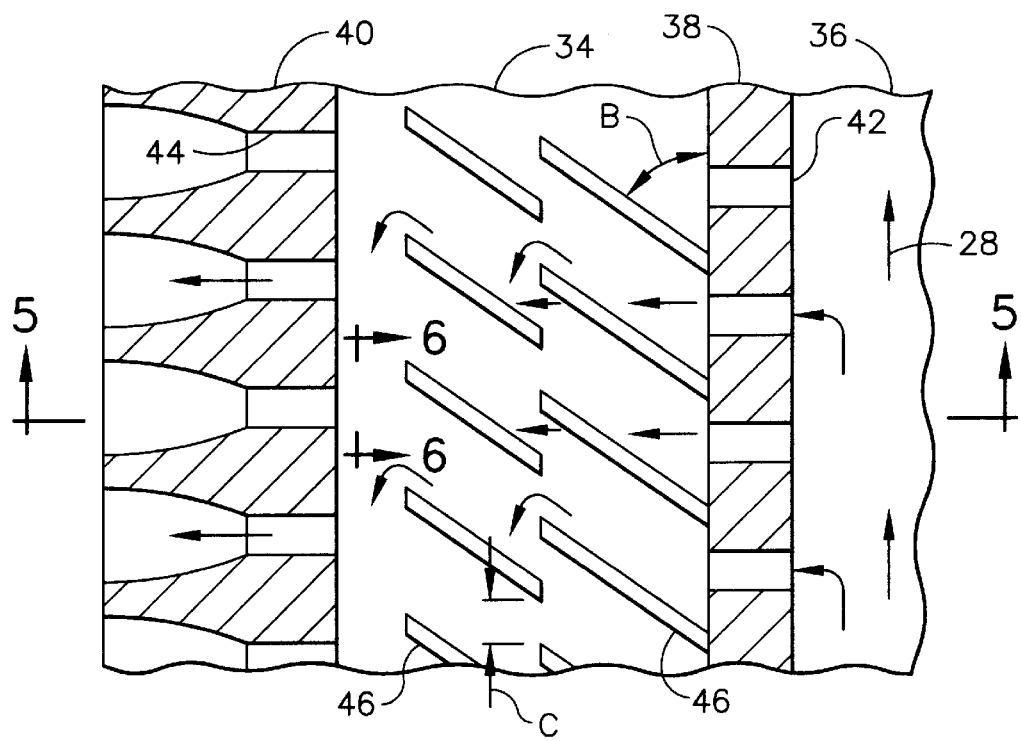
FIG. 4 is a partly sectional elevational view through the airfoil trailing edge illustrated in FIG. 3 and taken along line 4—4.
Figure 5:
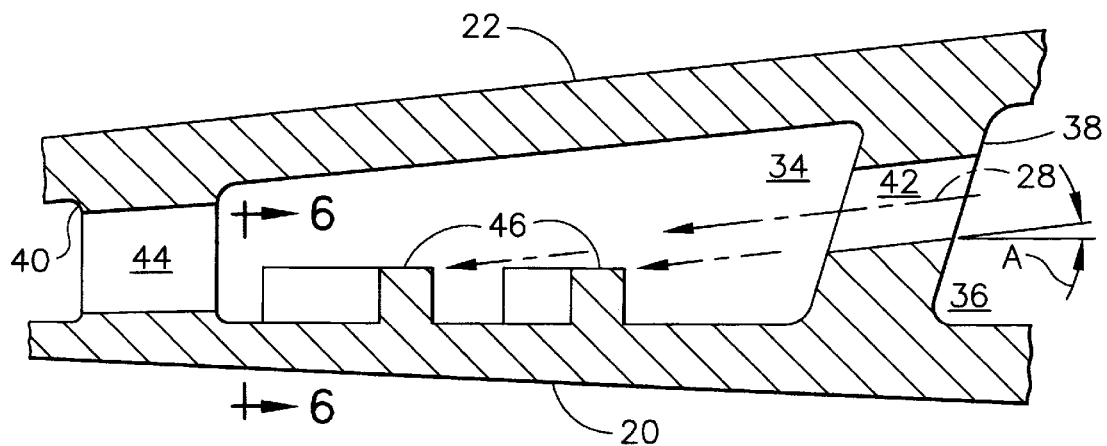
FIG. 5 is an enlarged radial sectional view through the airfoil trailing edge illustrated in FIG. 4 and taken along line 5—5.

As shown in FIGS. 3 and 4, the airfoil also includes a plurality of rows of short turbulators 46 disposed inside the first cavity 34. The turbulators 46, as best shown in FIG. 5, extend integrally from the first sidewall 20 in part height across the width of the first cavity 34, and are spaced at their tops from the inner surface of the second sidewall 22. The turbulators 46 have any suitable cross sectional configuration, such as the rectangular configurations illustrated with substantially equal widths and heights which may be about 10–15 mils in an exemplary embodiment. In view of the narrow width of the first cavity 34 in the trailing edge region of the airfoil, the turbulators 46 occupy only about a third of that width, with the inner surface of the second sidewall 22 being preferably smooth and without turbulators.

As shown in FIGS. 4 and 5, the turbulators extend generally along the chord direction of the airfoil, and are aligned in line of sight with the inlet holes 42 for being impingement cooled by the air jets channeled therefrom.

The turbulators 46 are arranged in parallel rows, as best shown in FIG. 4, along the span axis of the first cavity 34 with the air 28 being directed obliquely thereto along the axial or chord axis of the airfoil. As shown in FIG. 5, each of the inlet holes 42 is aligned at least in part with corresponding ones of the turbulators 46 in each of the rows for directly impinging the air thereagainst in multiple impingement, which occurs concurrently or substantially simultaneously without interference by the upstream row of turbulators.

As shown in FIG. 5, the inlet holes 42 have an acute inclination angle A relative to the inner surface of the first sidewall 20 along the axial direction which may be about 6 degrees, for example, for directing or aiming the inlet holes 42, and air jets therefrom, toward the multiple rows of turbulators 46. The shallow inclination angle allows the lower portion of the jet emanating from the inlet hole 42 to directly impinge a portion of the upstream row of turbulators 46, with an upper portion of the impingement jet bypassing the upstream turbulator row for directly impinging the turbulator row disposed downstream thereof.

Since the first cavity 34 is relatively narrow in width in the circumferential direction and relatively long in length along the chord direction, the impingement jets emanating from the inlet holes 42 have a relatively long axial flowpath in the first cavity 34. By introducing multiple rows of turbulators 46 all of which are aligned in part with the common inlet holes 42, different portions of the impingement jets can concurrently directly impinge all of the so-aligned turbulators 46 for enhancing cooling effectiveness of the available cooling air.

Impingement cooling has a local effect directly under the impingement jet. By aligning the multiple turbulator rows with the common inlet holes 42, effective impingement cooling may be obtained at multiple locations along the jet path within the first cavity 34. The multiple impingement locations increase cooling of the airfoil first sidewall 20 as compared with a single row of turbulators. And, the preferred alignment described above avoids significant pressure losses in the impingement jets which would compromise the cooling ability thereof.

As initially shown in FIGS. 3 and 4, the individual turbulators 46 are preferably elongate and straight with a suitably large length to height ratio for covering the axial and radial extent of the first cavity 34. As shown in FIG. 5, the turbulators 46 are preferably perpendicular to the underlying first sidewall 20 for receiving the air jets generally perpendicular thereto for impingement cooling thereof, while also promoting air tripping over the turbulators in a downstream direction of the jets.

As shown in FIG. 4, the turbulators 46 are preferably inclined along the span access of the first cavity 34, with the inclination of the turbulators being defined by an acute inclination angle B measured from the septum 38. The inclination angle B may be about 45–60 degrees in an exemplary embodiment for enhancing the cooling effectiveness of the impingement jets. The impingement jets impinge the respective turbulators 46 at a substantially identical inclination angle of about 45°–60°, for example, with the post-impingement or spent impingement air then being channeled in part downstream along the remaining length of the individual turbulators.

Accordingly, by inclining the individual turbulators along the first sidewall 20 between the inlet and outlet holes 42,44, the turbulators are effective for deflecting respective portions of the spent impingement air therealong in the downstream direction. This flow along the individual turbulators provides additional convection cooling thereof.

As shown in FIG. 4, the turbulators 46 are also preferably spaced apart from each other, and include respective trailing edges for shedding in vortices the spent impingement air deflected therealong. The multiple vortices provided by the multiple trailing edges of the multiple turbulators provide enhanced cooling over the inner surface of the first sidewall 20 not directly impingement cooled by the air jets.

The inner surface of the first sidewall 20 is therefore initially cooled by direct impingement cooling of the air jets where they impinge the respective turbulators; the spent impingement air then travels along the turbulators for additional convection cooling thereof; and, the spent impingement air is shed from the individual turbulators in vortices for providing additional cooling between the turbulators.

Figure 6:
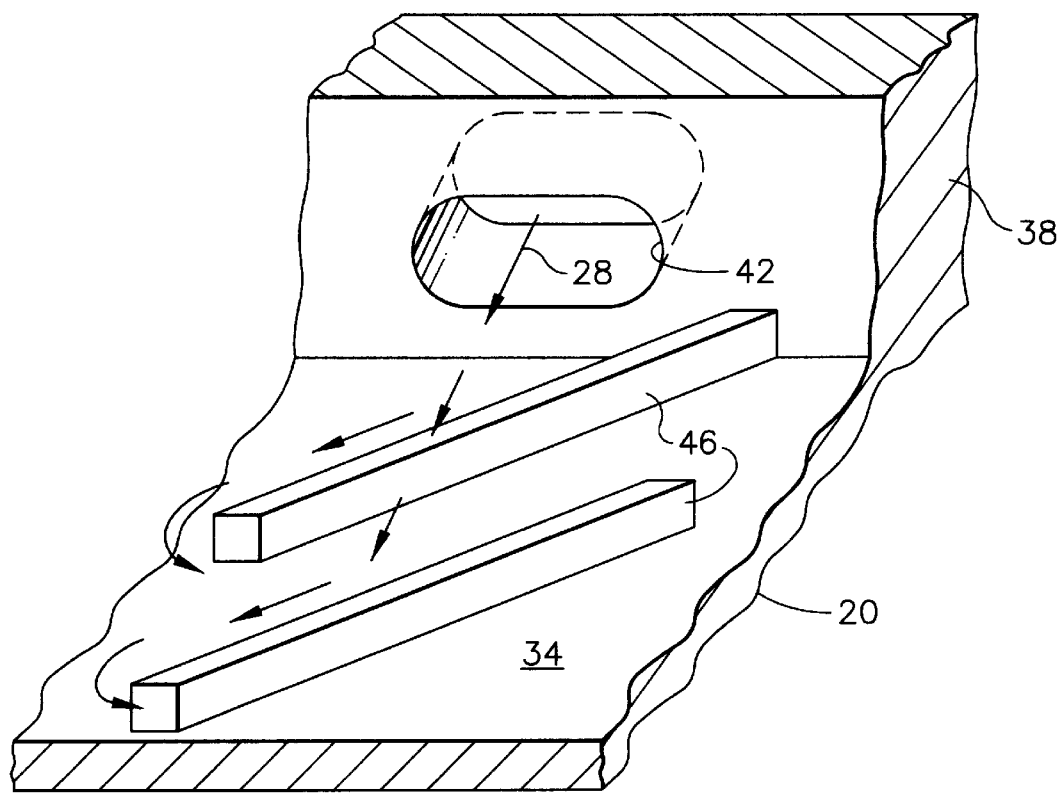
FIG. 6 is an isometric view of a pair of turbulators aligned with an inlet hole in the airfoil trailing edge illustrated in FIGS. 4 and 5 and taken along line 6—6.

These three different cooling effects from the same cooling air may be additionally appreciated by examining the flowpaths of the air illustrated in FIG. 6. The individual inlet holes 42 are preferably oval in cross section with two relatively straight sides and two semicircular sides, with each inlet hole being longer along the span axis of the airfoil, or along the length of the septum 38. Each inlet hole may have a width of about 30 mils, for example, and a length of about 60–80 mils, for example. By orienting the inlet holes 42 in length along the span axis of the septum 38, the impingement jets emanating from the holes impinge correspondingly long sections of the individual turbulators.

The width of each hole is sufficient for providing a jet of suitable width for concurrently directly impinging the multiple rows of turbulators downstream therefrom and aligned therewith. The inlet holes are preferably positioned in the septum 38 above the inner surface of the first sidewall 20 beginning at about the height of the individual turbulators to ensure a projection of the impingement jets downstream for impinging respective portions of the multiple turbulators.

As shown in FIG. 4, the turbulators 46 are preferably arranged in parallel rows, with two radial rows being illustrated. The turbulators 46 in each of the rows are preferably parallel to each other. And, the turbulators 46 are also preferably parallel to each other from row-to-row. In this way, the turbulators complement each other and cooperate with the respective inlet holes 42 for enhancing the cooling effectiveness of the impingement jets and the spent air therefrom.

In the embodiment illustrated in FIG. 4, the turbulators 46 in each of the two rows have a lateral offset C along the span axis from the turbulators in the adjacent row. The first row of turbulators 46 extends from the septum 38 to generally the middle of the first cavity 34, with the second row of turbulators commencing where the first row terminates, with the second row terminating short of the aft bridge 40. The trailing edges of the aft row of turbulators is thusly spaced from the aft bridge 40 for shedding vortices therebetween, and the trailing edges of the forward row of turbulators is spaced from the leading edges of the aft row of turbulators for also shedding vortices therebetween.

In the exemplary embodiment illustrated in FIG. 4, the turbulators 46 are also coaxially offset from row-to-row for providing turbulator overlap along the airfoil axial direction or along the direction of the impingement jets. Since the two rows of turbulators are not aligned end-to-end, multiple impingement may be obtained from row-to-row.

Figure 7:
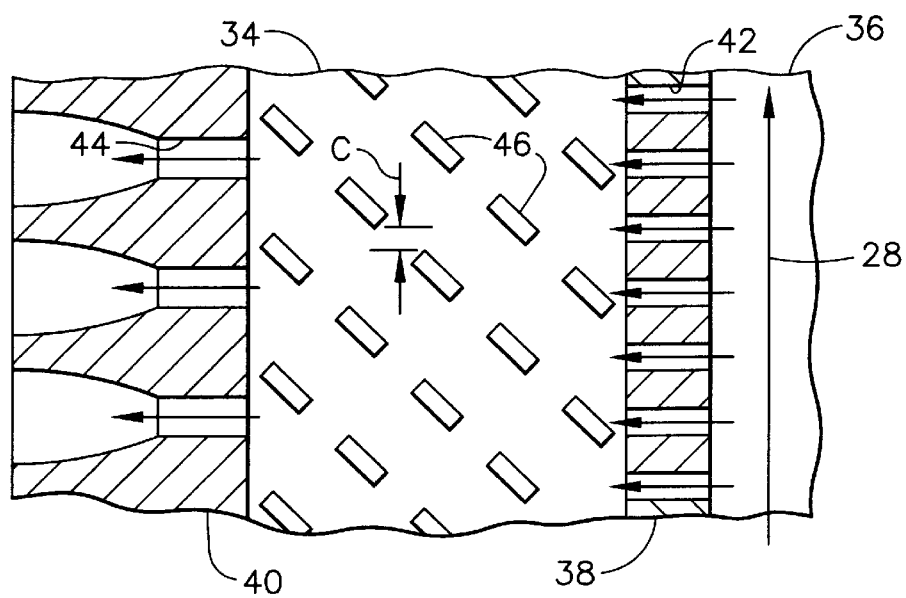
FIG. 7 is an elevational sectional view, like FIG. 4, illustrating turbulators in accordance with another embodiment of the present invention.

FIG. 7 illustrates an alternate embodiment of the turbulators 46 which are shorter in length than those illustrated in FIG. 4 and are arranged in five exemplary radial rows being oblique to the axial direction of the impingement jets. This embodiment shares common features with the embodiment illustrated in FIG. 4 including the span offset C between turbulators from row-to-row. The shorter turbulators permit more rows of turbulators to be introduced, with each row enjoying direct impingement cooling, convection cooling due to the inclination of the turbulators, and cooling from the vortices shed therefrom. In the FIG. 7 embodiment, the turbulators 46 are coaxially aligned from row-to-row in straight lines.

In both embodiments illustrated in FIGS. 4 and 7, the turbulators 46 in each of the several rows are preferably arranged in a one-to-one correspondence with respective ones of the inlet holes 42. In this way, the air jets from the inlet holes 42 may impinge each of the turbulators aligned along the jet axis for effecting multiple impingement cooling at the corresponding turbulators. And, the individual turbulators also provide convection cooling along their sides, and shed vortices for additional intertubulator cooling. In FIG. 7, the turbulators from row-to-row are offset or indexed along the span axis in a symmetrical pattern in which the turbulators are arranged in alternating axial rows of pairs and triplets for corresponding ones of the inlet holes 42.

The various embodiments of the multiple row turbulators disclosed above provide enhanced cooling on the inner surface of the airfoil first sidewall 20. In the preferred embodiment, the turbulators are placed inside the airfoil pressure side near the trailing edge which experiences a relatively high heat input from the combustion gases at this location. Enhanced cooling is effected without undesirable pressure losses from the multiple row turbulators. And, the turbulators cooperate with each other for spreading the cooling effectiveness of the original impingement jets to maximize the cooling efficiency thereof.

Although the invention has been described with respect to the exemplary turbine rotor blade disclosed above, it may also be used in other components such as turbine nozzle vanes wherein improved impingement cooling may be utilized therein.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. An airfoil comprising:

first and second sidewalls joined together at leading and trailing edges, and spaced apart to define first and second cavities separated by a septum;

a row of inlet holes extending through said septum in flow communication between said first and second cavities;

a row of outlet holes disposed in an aft bridge adjoining said first cavity in flow communication therewith; and a plurality of rows of elongate turbulators disposed inside said first cavity, and extending from said first sidewall and spaced from said second sidewall, and being aligned with said inlet holes for being impingement cooled by said air channeled therefrom.

2. An airfoil according to claim 1 wherein said turbulators are arranged in parallel rows along a span axis of said first cavity.

3. An airfoil according to claim 2 wherein each of said inlet holes is aligned in part with corresponding turbulators in each of said rows for directly impinging said air thereagainst.

4. An airfoil according to claim 3 wherein said turbulators are inclined along said first sidewall between said inlet and outlet holes for deflecting said air therealong.

5. An airfoil according to claim 4 wherein said turbulators are spaced apart from each other, and include trailing edges for shedding in vortices said air deflected therealong.

6. An airfoil according to claim 5 wherein said turbulators in each of said rows are parallel to each other.

7. An airfoil according to claim 6 wherein said turbulators are parallel to each other from row-to-row.

8. An airfoil according to claim 6 wherein said turbulators in each of said rows are offset along said span axis from said turbulators in an adjacent row.

9. An airfoil according to claim 8 wherein said turbulators are aligned from row-to-row.

10. An airfoil according to claim 8 wherein said turbulators are offset from row-to-row.

11. An airfoil according to claim 8 wherein said turbulators in said rows are arranged in a one-to-one correspondence with said inlet holes.

12. An airfoil according to claim 8 wherein said first cavity extends along said trailing edge, and said second cavity is disposed forwardly therefrom closer to said leading edge.

13. An airfoil according to claim 12 wherein said first sidewall is a generally concave, pressure side of said airfoil, said second sidewall is a generally convex, suction side of said airfoil, and said turbulators are disposed solely along aid first sidewall.

14. A turbine airfoil 12 comprising:

first and second sidewalls joined together at leading and trailing edges and spaced apart to define a first a cavity extending along said trailing edge, and a second cavity adjoining said first cavity by a septum therebetween;

a row of inlet holes extending through said septum in flow communication between said first and second cavities;

a row of outlet holes disposed in a aft bridge along said trailing edge in flow communication with said first cavity; and plurality of rows of elongate turbulators disposed inside said first cavity, and extending from said first sidewall and spaced from said second sidewall, and being aligned with said inlet holes for being impingement cooled by air channeled therefrom.

15. An airfoil according to claim 14 wherein:

said turbulators are arranged in parallel rows along a span axis of said first cavity; and each of said inlet holes is aligned in part with corresponding turbulators in each of said rows for directly impinging said air thereagainst.

16. An airfoil according to claim 15 wherein:

said turbulators are inclined along said first sidewall between said inlet and outlet holes for deflecting said air therealong; and said turbulators are spaced apart from each other, and include trailing edges for shedding in vortices said air deflected therealong.

17. An airfoil according to claim 16 wherein said turbulators in each of said rows are parallel to each other, and are parallel to each other from row-to-row.

18. An airfoil according to claim 17 wherein said turbulators in each of said rows are offset along said span axis from said turbulators in an adjacent row.

19. An airfoil according to claim 18 wherein said turbulators are offset from row-to-row.

20. An airfoil according to claim 19 wherein said turbulators in said rows are arranged in a one-to-one correspondence with said inlet holes.

* * * * *